No. 646,793. Patented Apr. 3, 1900.
H. BENTZ.
MEDICAL GALVANIC BATTERY.
(Application filed Nov. 9, 1899.)
(No Model.) 2 Sheets—Sheet 2.
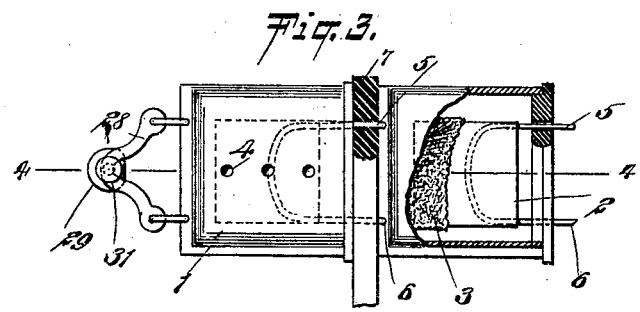
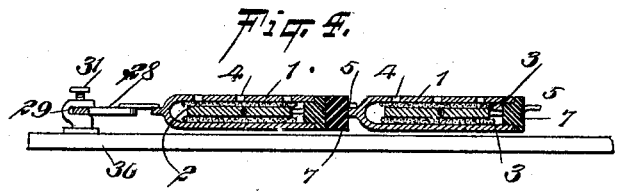
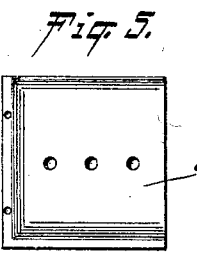  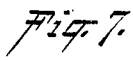 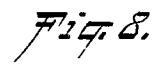
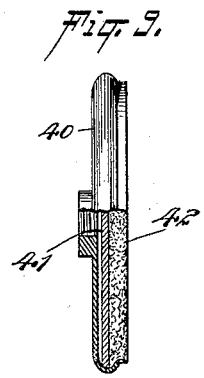
WITNESSES:
William P Goebel
C R Ferguson
INVENTOR
Harry Bentz
BY
ATTORNEYS

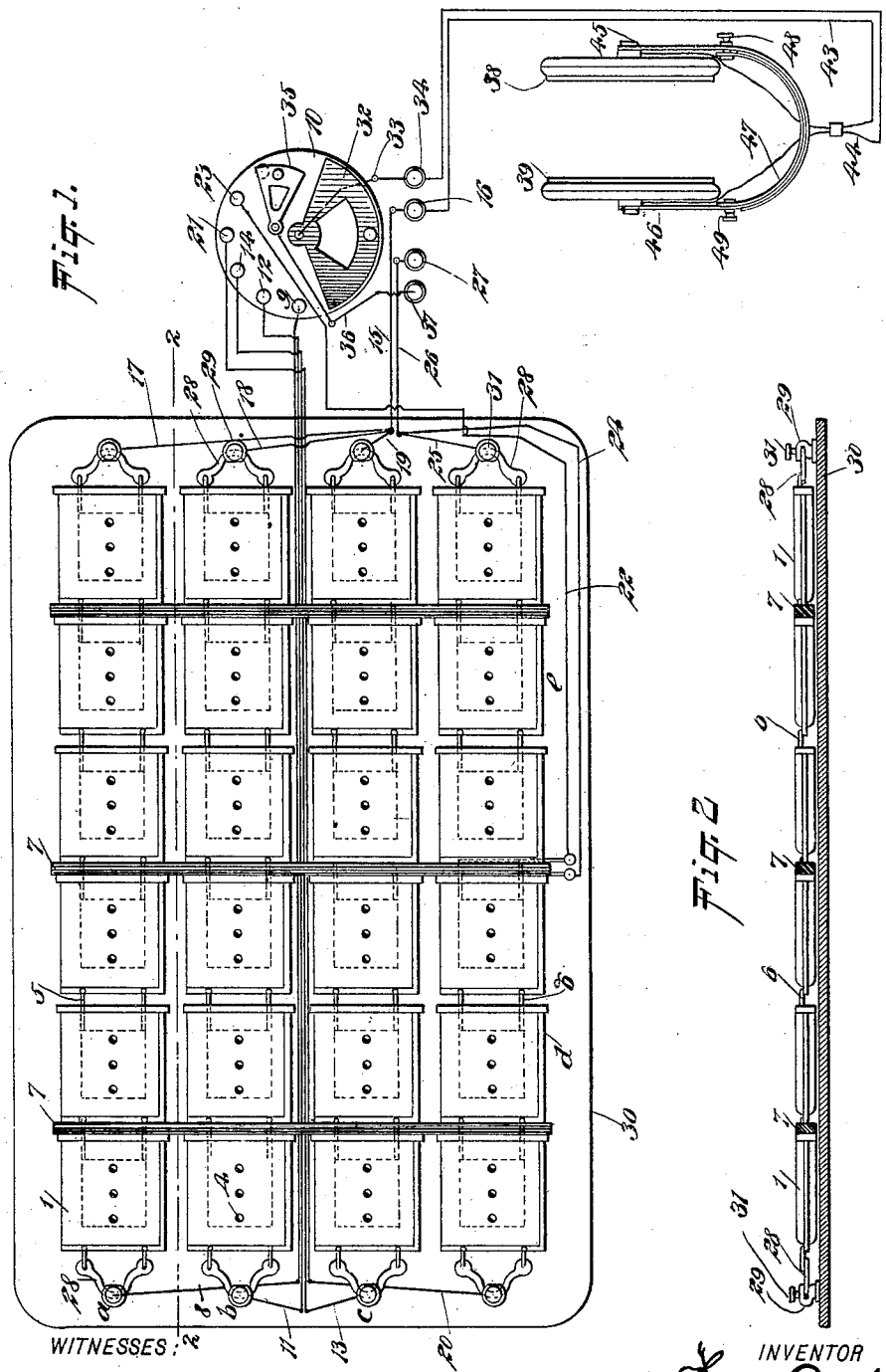

United States Patent Office.

HARRY BENTZ, OF NEW YORK, N. Y.

MEDICAL GALVANIC BATTERY.

SPECIFICATION forming part of Letters Patent No. 646,793, dated April 3, 1900.

Application filed November 9, 1899. Serial No. 736,351. (No model.)

*To all whom it may concern:*

Be it known that I, HARRY BENTZ, of the city of New York, borough of Manhattan, in the county of New York and State of New York, have invented a new and Improved Galvanic Battery, of which the following is a full, clear, and exact description.

This invention relates to improvements in galvanic batteries adapted to be worn or applied by a person for medicinal purposes; and the object is to provide a device of this character that shall be simple in its construction and having a simple means whereby the battery or current strength may be easily and quickly changed or regulated.

I will describe a galvanic battery embodying my invention and then point out the novel features in the appended claims.

Reference is to be had to the accompanying drawings, forming a part of this specification, in which similar characters of reference indicate corresponding parts in all the figures.

Figure 1 is a plan view of a battery and connections embodying my invention. Fig. 2 is a section on the line 2 2 of Fig. 1. Fig. 3 is a partial plan and partial section of a pair of cells embodied in the battery. Fig. 4 is a section on the line 4 4 of Fig. 3. Fig. 5 is a plan view of one of the battery elements. Fig. 6 is an end view thereof. Fig. 7 is a plan view of the other element. Fig. 8 is an end view thereof, and Fig. 9 is a partial section and partial edge view of one of the electrodes employed.

The battery comprises several sets of cells, the cells of each set being connected in series. Each cell consists of a copper element 1, made in the form of a box open at one end, and a zinc element 2, arranged within the copper element, and placed between the side surfaces of the plate-like zinc element and the inner surface of the copper element are absorbent pads 3, of felt or similar material. The copper element is provided with perforations 4, through which an exciting fluid may pass to be absorbed by the absorbent pads. This exciting fluid may be vinegar or acidulated water. The zinc element of one cell is connected by means of wires 5 6 with the copper element of the next cell, and the several cells may be held separated from one another by means of strips 7 of rubber or the like. One set of cells (indicated at $a$) has the copper element of the first cell connected by means of a wire 8 with a contact-point 9 on a circuit-controller 10. The copper element of the first cell in the next set $b$ is connected by a wire 11 with a contact-point 12 on the circuit-controller, and the copper element of the first cell in the next set $c$ is connected by means of a wire 13 with a contact-point 14 on the circuit-controller. The zinc element at the opposite end of each set of cells is connected by a wire 15 with a binding-post 16, the connections with the wire 15 being through the wires 17, 18, and 19. It will be noted that there are six cells in each of the battery sets $a$, $b$, and $c$. Other sets $d$ and $e$, however, consist each of two cells. The copper element of the first cell in the set $b$ is connected by a wire 20 with a contact-point 21 on the circuit-controller, and the copper element of the first cell in the set $e$ is connected by a wire 22 with a contact-point 23 on the circuit-controller. These two sets $d$ and $e$ have their terminal zinc elements connected by wires 24, 25, and 26 with a binding-post 27. As here shown, the extreme end elements are connected by means of metal loops 28 with binding-posts 29, from which the several wires extend. These binding-posts are made in the form of hooks, secured to a base 30, and each has a clamping-screw 31.

Mounted on the disk 10 to coact with the several contact-points thereon is a segmental plate or circuit-closer 32, and from this plate a wire 33 extends to a binding-post 34. This plate is pivoted on the disk 10 and is of sufficient area to be placed in engagement with all the contact-points on the disk, so as to close the circuit through all of the battery-cells. Also mounted on the disk is a circuit-closing plate 35, made in the form of a segment and adapted for engagement only with the contact-point 23 or with said point 23 and the contact-point 21, and from this circuit-closing plate 35 a wire 36 extends to a binding-post 37.

In using my invention I employ electrodes 38 39 so arranged that they may be placed upon any portion of a person's body or head. Each electrode consists of a casing 40, of insulating material, within which is arranged a metal plate or disk 41, and engaging against each plate or disk is an absorbent material 42—such, for instance, as sponge. The electrode 38 is connected by a wire 43 with the binding-post 16, and the electrode 39 is connected by a wire 44 with the binding-post 34. For convenience in applying the electrodes I mount them in an adjustable frame consisting of longitudinally-slotted bow-plates 45 46, these plates being connected, respectively, at one end to a hub portion on the electrodes 38 39, and they are adjustable on a U-shaped longitudinally-slotted plate 47, and they are held as adjusted relatively to the plate 47 by means of set-screws 48 49, the set-screw 48 passing through the plates 45 and 47 and the set-screw 49 passing through the plates 46 and 47. These several plates are of spring-yielding material, and obviously by their use and construction the electrodes may be moved toward or from each other to accommodate them to a person's head, arm, leg, or the like.

In operation the battery and the circuit-controller may be placed upon a belt to be worn by a person; but I do not confine my invention to thus mounting the parts, as it is obvious that the battery and circuit-controller may be placed quite remote from each other or arranged in a suitable case, the electrodes being free for movement from place to place. Should a weak current be desired or that from a single set of cells, the plate 32 will be turned into engagement with the contact-point 9, thus utilizing the current from the set of cells $a$. Should a stronger current be desired, the plate will be turned into engagement with the contacts 9 and 12, thus utilizing the current from the two sets of cells $a$ $b$, and obviously when the plate is turned into engagement with all of the contact-points the strength of the entire battery will be passed through the electrodes and through the body of a person in contact with the electrodes and serving as a circuit-closer between the electrodes.

By means of the binding-posts 27 and 37 another set of electrodes may be employed, if desired, and energized either from the set of cell elements $e$ upon turning the plate 35 into engagement with the contact-point 23 or from both the sets of cells $d$ and $e$ by turning said plate 35 into engagement with the contact-points 23 and 21.

Having thus fully described my invention, I claim as new and desire to secure by Letters Patent—

1. A medicinal galvanic battery, comprising a number of sets of cells all mounted on a single support, the cells of each set being connected in series, a circuit-closer for controlling a circuit through one or all of said sets of cells, and another circuit-controller for closing the circuit through one or two of said sets of cells independently of the other cells, substantially as specified.

2. A medicinal galvanic battery, comprising a number of sets of cells, a circuit-controller comprising a disk, contact-points on said disk having connection with the various sets of cells, a circuit-closing plate mounted to rotate on said disk and adapted for engagement with all of the contact-points, and another circuit-closing plate mounted to rotate on said disk and adapted for closing the circuit through two of said sets of cells, substantially as specified.

3. A medicinal galvanic battery, comprising a number of sets of cells, a circuit-controller comprising a disk, contact-points mounted on said disk, each contact-point being connected with a set of cells, a circuit-closing plate mounted to rotate on said disk and adapted to engage with all of the contact-points, another circuit-closing plate mounted to rotate on said disk and adapted to close the circuit through two sets of said cells, and electrodes in the circuit, substantially as specified.

4. A galvanic-battery cell, comprising a box-like element open at one end and having perforations in one of its walls, a plate-like element arranged within the box-like element, absorbent pads arranged between the elements, means for connecting the plate-like element with the box-like element of the next cell in the battery, and strips of insulating material separating the cells one from another, substantially as specified.

5. In a galvanic battery a support, a series of cells, loop-plates connecting the elements of the cells, hook-shaped binding-posts on the base and adapted to receive said plates, and clamping-screws therefor, substantially as specified.

6. In a medicinal battery, a pair of electrodes, a longitudinally-slotted curved plate connected to each electrode, a longitudinally-slotted U-shaped plate, all of said plates being of spring-yielding material, and clamping devices for securing the first-named plates as adjusted on the U-shaped plate, substantially as specified.

HARRY BENTZ.

Witnesses:
CHAS. M. SIBLEY,
L. BROSNAN.